March 25, 1930.  J. C. HINES  1,751,999
APPARATUS FOR FILTERING AIR
Filed May 26, 1927   2 Sheets-Sheet 1

Inventor
John C. Hines
By Daniel Brennan
Attorney

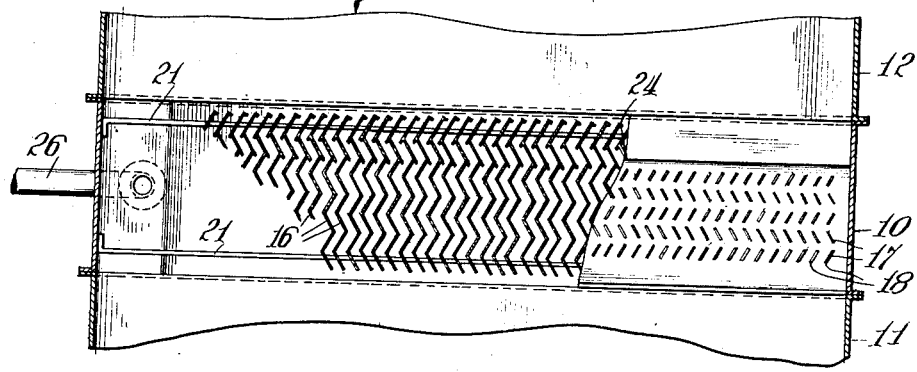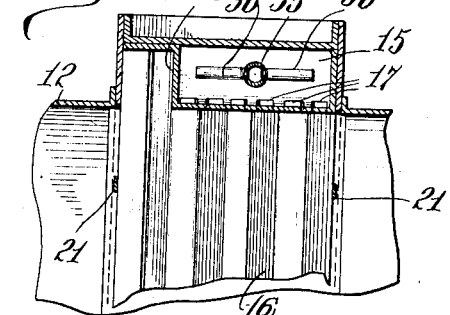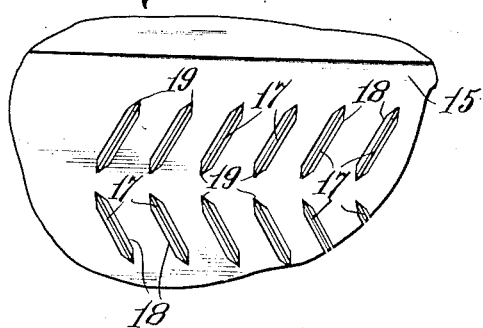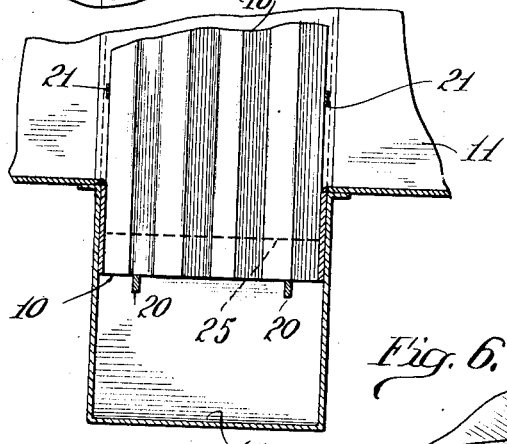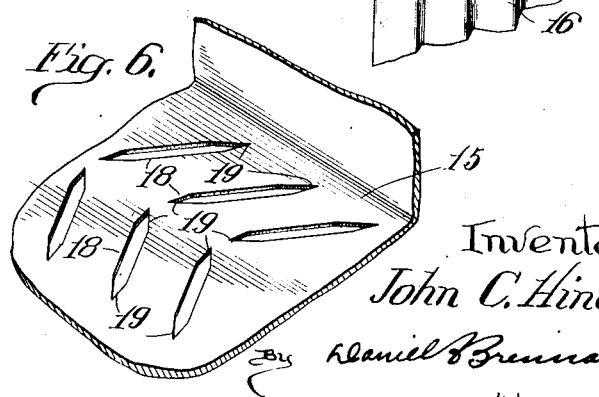

Patented Mar. 25, 1930

1,751,999

UNITED STATES PATENT OFFICE

JOHN C. HINES, OF CHICAGO, ILLINOIS

APPARATUS FOR FILTERING AIR

Application filed May 26, 1927. Serial No. 194,377.

My invention relates to improvements in apparatus for filtering air and has for its object the provision of an improved apparatus of this character by means of which solid particles may be readily and efficiently removed from air employed in ventilating.

Another object of the invention is to provide a simple and improved construction of this character by means of which air may be purified or filtered without adding undue moisture thereto.

Another object of the invention is to provide an improved construction of this character by means of which air may be readily and efficiently subjected to the action of flowing oil and solid particles thereby removed.

Another object of the invention is to provide an improved apparatus by means of which air may be efficiently and economically filtered without the addition of undue moisture thereto.

Other objects will appear hereinafter.

In general the objects of the invention are attained by providing a suitable air filter and passing the air to be purified therethrough. The air filter contains a plurality of zig-zag plates over which oil flows. The surfaces of said zig-zag plates provide tortuous passages for the air passing through the filter. The solid particles in the air are absorbed by the oil and thereby removed from the air without addition of moisture to the air. The solid particles thus removed from the air are then filtered from the oil and the oil again used in the apparatus.

The invention consists in the apparatus hereinafter described and claimed.

The invention will be best understood by reference to the accompanying drawings forming a part of this specification in which—

Fig. 3 is a partially sectional view taken substantially on line 3—3 of Fig. 1;

Fig. 4 is a partial vertical transverse section taken substantially on line 4—4 of Fig. 1;

Fig. 5 is an enlarged detail partial plan view of a portion of the bottom of an oil trough employed in the apparatus;

Fig. 6 is a perspective view of a portion of the bottom of said oil trough with the baffle or filter plates removed; and Fig. 7 is a perspective view of a portion of one of the baffle or filter plates.

Figure 1:
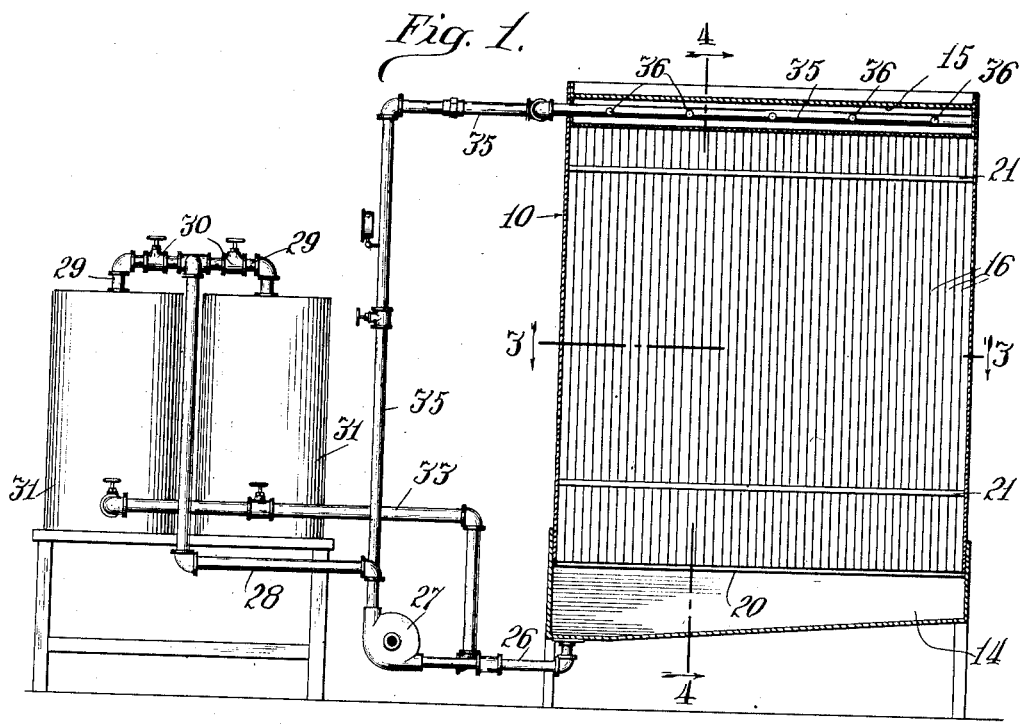
Fig. 1 is a side view shown partially in vertical section of an apparatus embodying the invention.
Figure 2:
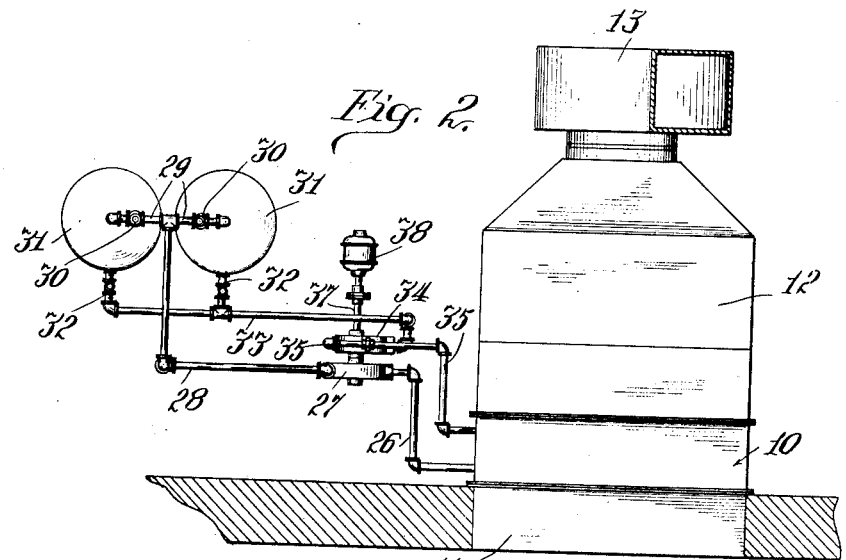
Fig. 2 is a top plan view of the same on a reduced scale and shown partially in section.

The preferred form of construction as illustrated in the drawings comprises a suitable air chamber or casing 10 made of sheet metal and having at one side an air entry 11 through which the air to be filtered enters the same.

A discharge passage 12 leads from the other side of the air filter 10 to a suction fan 13 for circulating the air and suitable heating coils may, if desired, be inserted in the passage 12.

An oil sump or well 14 having an inclined bottom, as shown, is arranged at the bottom of the filter chamber 10 and an oil supply trough 15 is arranged at the top thereof.

Baffle plates 16 in substantially zig-zag form are arranged, as shown, in the filter chamber 10 in substantially parallel relation so as to form tortuous passages therethrough for the air passing to the fan 13. The baffle plates 16 are provided at their upper edges with lugs 17 fitting slots 18 in the bottom of the oil trough 15, the slots 18 being considerably wider than said lugs 17 but having contracted ends 19 snugly fitting said lugs and whereby the upper edges of said baffle plates will be nicely and snugly held in place, but ample space allowed at the sides of said lugs for the free flow of oil downwardly over said baffle plates. The baffle plates 16 are extended downwardly into the oil sump 14 and are supported therein on the supporting bars 20, said baffle plates being further bound and secured together by means of binding straps or bars 21, as shown.

The two endmost sections 22 of the baffle plates 16 are extended upwardly, as shown, beyond the remainder of the sections to fit within a compartment 24 formed adjacent the rear edge of the trough 15, said compartment operating as an oil trap to prevent oil from being dragged along the bottom of the trough 15 by the passage of the air.

As shown each of the end sections 22 is provided with a back-turned lip or flange 23 adapted to act as barriers to prevent the oil from being entrained with the air and carried transversely off the surfaces of the plates.

The lower ends of the baffle plates are extended downwardly beyond the oil level 25 maintained in the sump 14 and whereby an oil seal is formed at the bottom to prevent leakage of air so that all the air is constrained to pass through the tortuous passages provided by the baffle plates.

A pipe 26 is connected with the lowermost portion of the oil sump 14 and leads to a pump 27 connected by a pipe 28 with branch pipes 29 having valves 30 therein, said branch pipes leading into the upper portions of oil filtering cylinders 31, as shown. Valved branch pipes 32 lead from the lower ends of the filter cylinders 31 and connect with a pipe 33 leading to a pump 34 from which a pipe 35 leads into the oil trough 15, said pipe 35 being provided with branch pipes 36 in said trough. The pumps 34 and 27 are operated by a shaft 37 driven by a common motor 38.

The arrangement is such that the oil flowing over the surfaces of the baffle plates from the trough 15 will be removed from the sump 14 and passed through the filter chambers 31 and returned to the trough 15. By means of the valves, as shown, either of the filter chambers 31 may be employed for the purpose while the other is being cleaned thus avoiding interruption of the process.

By this arrangement the solid particles contained in the incoming air will be absorbed by the oil and thereby removed from the air without in turn imparting moisture or other gas to the air, a non-volatile oil being employed. In this way the air may be cleaned and purified in an economical and efficient manner without offering undue resistance to the passage of the air and without adding objectionable moisture thereto.

While I have illustrated and described the preferred apparatus for carrying my invention into effect these are capable of variation and modifications without departing from the spirit of the invention. I therefore do not wish to be limited to the precise details set forth but desire to avail myself of such variations and modifications as fall within the scope of the appended claim.

I claim:

Air filtering apparatus comprising a filtering chamber; an oil sump at the bottom of said chamber; an oil trough at the top of said chamber, said oil trough being provided with a plurality of slots arranged in zig-zag form; a plurality of filter plates in zig-zag form arranged in said filter chamber in substantially parallel relationship, said plates being provided at their tops with lugs engaging said slots but permitting the free flow of oil through said slots and over said plates, the lower ends of said plates being immersed in oil in said oil sump; means for passing air transversely through said filter chamber; back-turned flanges on said plates serving as barriers to prevent the oil on said plates from being entrained with the air current and carried transversely off said plates, and means for circulating oil between said sump and said trough.

In testimony whereof I affix my signature at 10 South La Salle Street, Chicago, Illinois.

JOHN C. HINES.